(12) United States Patent
Amada et al.

(10) Patent No.: US 8,228,583 B2
(45) Date of Patent: Jul. 24, 2012

(54) OPTICAL SCANNING DEVICE AND IMAGE FORMING APPARATUS

(75) Inventors: Taku Amada, Kanagawa (JP); Hibiki Tatsuno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/117,721

(22) Filed: May 27, 2011

(65) Prior Publication Data

US 2011/0310450 A1    Dec. 22, 2011

(30) Foreign Application Priority Data

Jun. 17, 2010 (JP) ................................. 2010-138079

(51) Int. Cl.
*G02B 26/08* (2006.01)
(52) U.S. Cl. ............... 359/212.1; 359/204.1; 359/204.3; 359/212.2; 359/216.1
(58) Field of Classification Search .... 359/196.1–226.2; 347/243, 259–261
See application file for complete search history.

(56) References Cited

U.S. PATENT DOCUMENTS

| | | | |
|---|---|---|---|
| 5,636,049 A * | 6/1997 | Kawata et al. ............. | 359/211.1 |
| 5,952,649 A | 9/1999 | Amada | |
| 6,621,512 B2 | 9/2003 | Nakajima et al. | |
| 6,771,300 B2 | 8/2004 | Amada et al. | |
| 6,924,938 B2 | 8/2005 | Nishina et al. | |
| 7,031,074 B2 | 4/2006 | Nishina et al. | |
| 7,050,082 B2 | 5/2006 | Suzuki et al. | |
| 7,064,902 B2 | 6/2006 | Nishina et al. | |
| 7,145,589 B2 | 12/2006 | Amada et al. | |
| 7,164,541 B2 | 1/2007 | Nishina et al. | |
| 7,206,014 B2 | 4/2007 | Amada et al. | |
| 7,333,254 B2 | 2/2008 | Amada et al. | |
| 7,403,316 B2 | 7/2008 | Amada | |
| 7,450,274 B2 | 11/2008 | Itabashi et al. | |
| 7,460,145 B2 | 12/2008 | Amada et al. | |
| 7,505,060 B2 | 3/2009 | Amada et al. | |
| 7,525,561 B2 | 4/2009 | Nakajima et al. | |
| 7,532,227 B2 | 5/2009 | Nakajima et al. | |

(Continued)

FOREIGN PATENT DOCUMENTS

JP        2009-294327        12/2009

(Continued)

OTHER PUBLICATIONS

U.S. Appl. No. 11/802,914, filed May 25, 2007, Mitsuo Suzuki, et al.

*Primary Examiner* — James Phan
(74) *Attorney, Agent, or Firm* — Oblon, Spivak, McClelland, Maier & Neustadt, L.L.P.

(57) ABSTRACT

An optical scanning device includes: a light source unit that includes a light emitting unit composed of a laser light source emitting linearly polarized light inside a package member; a deflector that deflects a light beam emitted from the light emitting unit; a pre-deflector optical system arranged on an optical path between the light emitting unit and the deflector; and a scanning optical system that scans a target surface to be scanned with the light beam deflected by the deflector. The pre-deflector optical system includes at least two parallel plate optical elements each composed of a transparent medium having an incident surface and an exit surface parallel to each other. The parallel plate optical elements are arranged to be tilted in inclination that is opposite to each other in a plane of polarization of the linearly polarized light.

14 Claims, 10 Drawing Sheets

U.S. PATENT DOCUMENTS

| | | |
|---|---|---|
| 7,684,100 B2 | 3/2010 | Amada |
| 7,706,040 B2 | 4/2010 | Amada et al. |
| 7,710,445 B2 | 5/2010 | Amada et al. |
| 7,719,737 B2 | 5/2010 | Amada et al. |
| 7,777,774 B2 | 8/2010 | Suzuki et al. |
| 7,936,492 B2 | 5/2011 | Amada et al. |
| 2006/0238845 A1 | 10/2006 | Atsuumi et al. |
| 2007/0081152 A1 | 4/2007 | Amada |
| 2008/0069585 A1 | 3/2008 | Amada |
| 2008/0204852 A1 | 8/2008 | Amada et al. |
| 2009/0059335 A1 | 3/2009 | Amada et al. |
| 2009/0314927 A1 | 12/2009 | Tatsuno et al. |
| 2009/0323147 A1 | 12/2009 | Amada et al. |
| 2010/0124434 A1 | 5/2010 | Tatsuno |
| 2010/0195681 A1 | 8/2010 | Tatsuno et al. |
| 2011/0052263 A1 | 3/2011 | Tatsuno et al. |

FOREIGN PATENT DOCUMENTS

| | | |
|---|---|---|
| JP | 2010-122473 | 6/2010 |

* cited by examiner

MAIN-SCANNING CROSS-SECTION

SUB-SCANNING CROSS-SECTION

MAIN-SCANNING CROSS-SECTION

SUB-SCANNING CROSS-SECTION

LIGHT INCIDENT ON DEFLECTOR

TRAVELING DIRECTION OF LASER BEAM

LIGHT REFLECTED ON DEFLECTOR

TRAVELING DIRECTION OF LASER BEAM

MAIN-SCANNING CROSS-SECTION

SUB-SCANNING CROSS-SECTION

MAIN-SCANNING CROSS-SECTION

SUB-SCANNING CROSS-SECTION (a) LINEARLY POLARIZED LIGHT OSCILLATING IN VERTICAL DIRECTION
(b) CIRCULARLY POLARIZED LIGHT
(c) LINEARLY POLARIZED LIGHT OSCILLATING IN HORIZONTAL DIRECTION
(d) CIRCULARLY POLARIZED LIGHT

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-138079 filed in Japan on Jun. 17, 2010.

BACKGROUND OF THE INVENTION

1. Field of the Invention

The present invention relates to an optical scanning device and an image forming apparatus including the optical scanning device.

2. Description of the Related Art

In recent years, there is an increasing need for an image forming apparatus to have a higher processing speed and a better resolution and, accordingly, it is desired to improve a scanning speed of a scanning unit included therein. When a rotary polygon mirror is used in a high-speed optical deflection device, which is necessary to realize a high-speed scanning, for example, limitations exist for an increase in a rotational speed thereof.

By contrast, an image forming apparatus using a so-called "multi-beam scanning device" has been proposed to enable to scan a plurality of scanning lines simultaneously in a single scanning process by carrying out a scanning processing with a plurality of light beams that are output from a surface emitting laser having a plurality of light emitting points (a vertical cavity surface emitting laser, which is abbreviated as a VCSEL hereinafter). A method to realize a high-speed output of an image data is to make use of a plurality of beams for emission in such a way as the VCSEL does and, in particular, it has become general for a high-speed output apparatus to be equipped with a light source designed for multi-beam writing.

However, when the VCSEL is used as a light source unit in an optical scanning device included in an image forming apparatus, an intensity of a scanning beam may be altered by a temperature change or an aging variation to result in an uneven density in a final image (an output image). Thus, there is a widely known technique to suppress an appearance of an uneven density by performing Automatic Power Control (APC) that controls a drive signal of a light source based upon a result of a monitoring by detecting a part of the laser beams emitted by a light source of an optical scanning device with a monitoring element consisting of a detector such as a photodiode. (for example, see Japanese Patent Application Laid-open No. 2010-122473, and Japanese Patent Application Laid-open No. 2009-294327).

However, if the intensity of the monitoring beams received by the monitoring element is not strong enough, the monitoring element cannot detect the intensity accurately and, hence, the APC fails to function properly to make it difficult to maintain a light output to a predetermined value. As a result, the intensity of beam scanning becomes unstable to result in deterioration of the output image.

Furthermore, there is another problem in that the light output of the VCSEL is susceptible to reflected return light, and noise is easily generated by lights reflected by optical elements that are arranged in an optical path. Accordingly, the beam intensity fluctuates to cause an uneven density in the image. In other words, as illustrated in FIG. 12, in an optical system in which divergent light emitted by a light source unit 10 is converted into parallel rays by a coupling lens 24 and is collimated by an aperture 16, if a control treatment of a reflectance of the aperture 16 by, e.g., anti-reflection coating, is insufficient, weak light returns to the light source unit (VCSEL) to generate a noise.

As illustrated in FIG. 13, a method is known to solve the problem by arranging a quarter-wave plate 23 between the coupling lens 24 and the aperture 16.

Linearly polarized light that is oscillating by the linear polarization in a vertical direction on a surface of a drawing, as indicated by a symbol (a) in FIG. 13, is converted into circularly polarized light (b) after passing through a quarter-wave plate 23. Weak circularly polarized light (d) reflected on the aperture 16 passes through the quarter-wave plate 23 again, and is converted into linearly polarized light oscillating in a direction perpendicular to the direction of the oscillation thereof emitted by the light source (linearly polarized light (c) oscillating in a direction perpendicular to the surface of the drawing). Even if there is return light to the light source, light waves do not interfere with each other as long as the oscillation directions of light are perpendicular with each other and, hence, no noise is generated. Thus, by using the quarter-wave plate 23, the sensitivity of the VCSEL to the return light toward the light source can be reduced. Furthermore, as illustrated in FIG. 13, by rotating the quarter-wave plate 23 along an axis that is perpendicular to the surface of the drawing, it is avoidable for the light reflected by an incident face of the quarter-wave plate 23, i.e., a light source unit side, to return to the light source unit 10.

Typically, to prevent dust or the like from sticking to a light emitting element such as a semiconductor laser chip, the light emitting element is housed in a package member. The side thereof from which the laser beams are output is sealed with a piece of transparent glass or cover glass. Japanese Patent Application Laid-open No. 2009-294327 discloses the method to reduce the generation of aberration by rotating the quarter-wave plate along an axis that is perpendicular to the sub-scanning cross-section to achieve a small width for the aperture in the sub-scanning direction. It is assumed in the patent that, by setting (or adjusting) the relative positional relationship between the quarter-wave plate and the above-described transparent glass appropriately, the amount of the aberration can be further reduced associated with a simultaneous possible decrease in a reduction of the intensity. However, such a method is not disclosed in the patent.

Japanese Patent Application Laid-open No. 2010-122473 discloses a method with which it is possible, by using a light blocking member, to block a part of light beams that has passed through the coupling lens yet that is not used either in the beam scanning by reaching a target surface to be scanned or in the monitoring light beams to achieve downsizing in the aperture consisting of a pair of mirrors and an optical monitoring system without losing light use efficiency. With this method, however, there arises a problem in that the reduction in the intensity caused by transmission or reflection in each of the optical elements is unavoidable and, accordingly, the intensity of the laser beams incident on the target surface to be scanned or a monitoring sensor may be decreased.

SUMMARY OF THE INVENTION

It is an object of the present invention to at least partially solve the problems in the conventional technology.

According to an aspect of the present invention, there is provided an optical scanning device that scans a target surface to be scanned with a light beam and writes image information onto the target surface to be scanned. The optical scanning device includes: a light source unit that includes a light emitting unit composed of a laser light source emitting linearly polarized light inside a package member; a deflector that deflects a light beam emitted from the light emitting unit; a pre-deflector optical system arranged on an optical path between the light emitting unit and the deflector; and a scanning optical system that scans the target surface to be scanned with the light beam deflected by the deflector. The pre-deflector optical system includes at least two parallel plate optical elements each composed of a transparent medium having an incident surface and an exit surface parallel to each other. The parallel plate optical elements are arranged to be tilted in inclination that is opposite to each other in a plane of polarization of the linearly polarized light.

DETAILED DESCRIPTION OF THE PREFERRED EMBODIMENTS

Exemplary embodiments of an optical scanning device and an image forming apparatus according to the present invention are described below in greater detail with reference to the accompanying drawings. The present invention is not limited to the embodiments described below, and various changing, such as other embodiments, addition, modification, and deletion, can be made within the scope of the assumption of those skilled in the art. Any one of the aspects is within the spirit and scope of the present invention as long as it has an advantageous effect of the present invention.

Figure 1A:
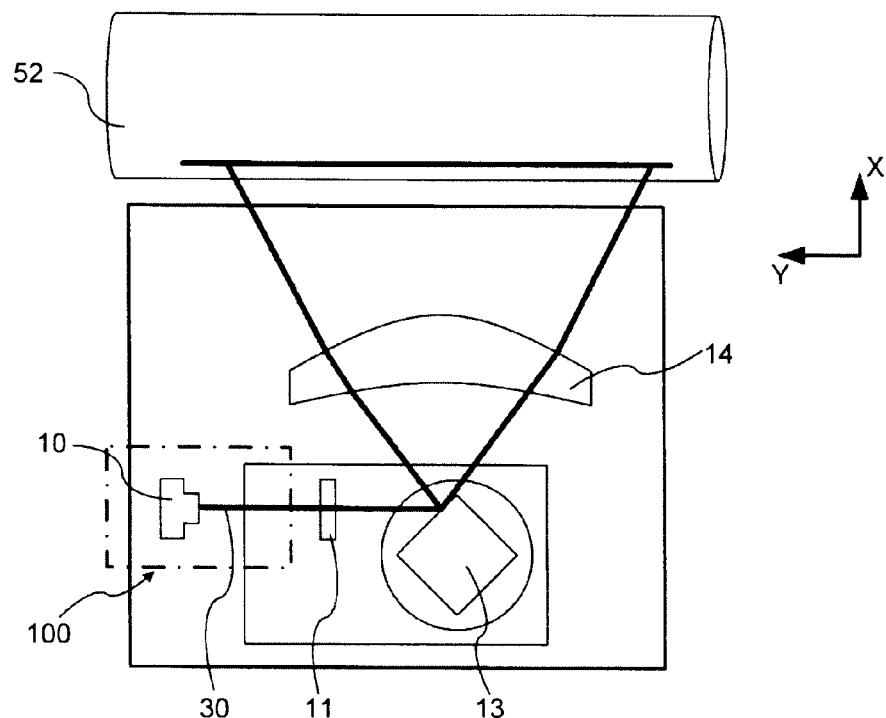
FIG. 1A is a schematic of an example of an optical scanning device according to the present invention in the main-scanning cross-section (X-Y cross-section) depicted in a right-handed coordinate system.
Figure 1B:
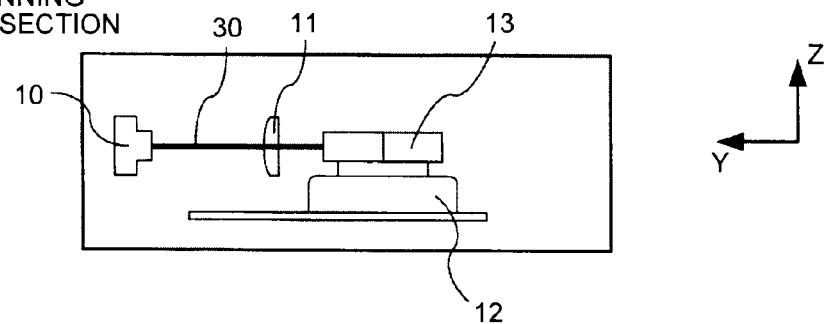
FIG. 1B is a schematic of the example of the optical scanning device in the sub-scanning cross-section (Y-Z cross-section) depicted in the right-handed coordinate system.

FIG. 1A illustrates a main-scanning cross-section (X-Y cross-section) of an optical scanning device according to the present invention, and FIG. 1B illustrates a sub-scanning cross-section (Y-Z cross-section) of the optical scanning device. Note that both FIG. 1A and FIG. 1B are depicted in the right-handed coordinate system.

As illustrated in FIGS. 1A and 1B, laser beam 30 emitted by a light source unit 10 is reflected by a reflecting surface of a polygon mirror 13 of an optical deflector (polygon scanner) 12 as line images extending in the main-scanning direction by the action of a cylindrical lens 11. After passing through a scanning lens 14, the laser beam 30, deflected by the polygon scanner 12, is applied to the surface of a photosensitive element 52 as beam spots during scanning.

Figure 2A:
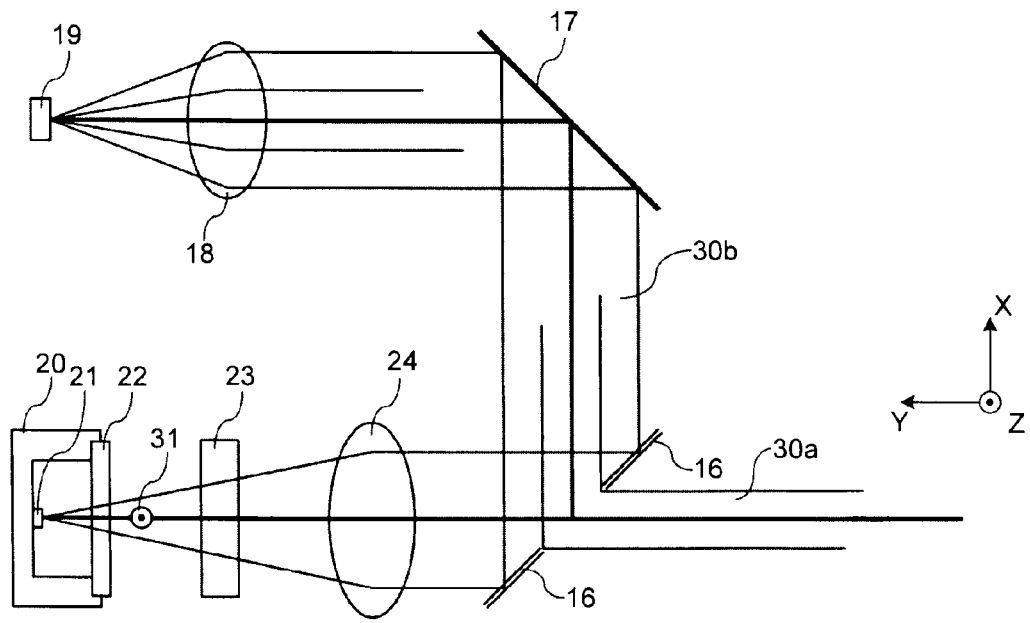
FIG. 2A is an enlarged schematic of an area 100 near a light source unit illustrated in FIG. 1A in the main-scanning cross-section (X-Y cross-section) depicted in the right-handed coordinate system.
Figure 2B:
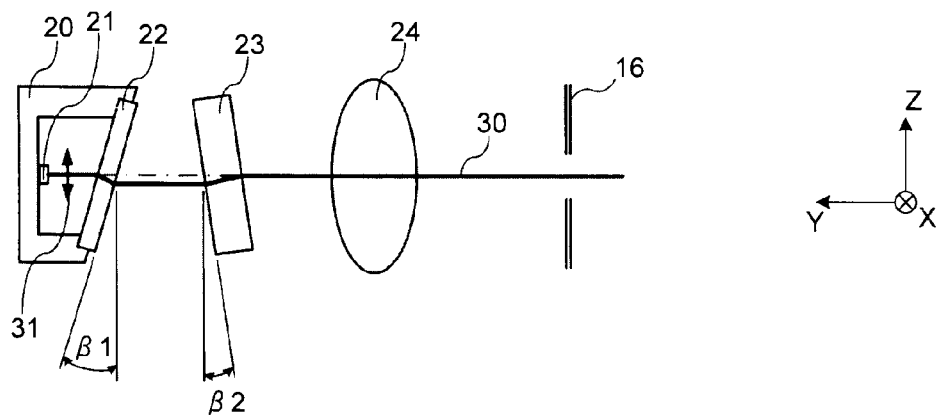
FIG. 2B is an enlarged schematic of the area 100 in the sub-scanning cross-section (Y-Z cross-section) depicted in the right-handed coordinate system.

FIG. 2A illustrates an enlarged schematic of a region 100 near the light source unit 10 illustrated in FIG. 1A in the main-scanning cross-section (the X-Y cross-section), and FIG. 2B illustrates the enlarged schematic of the same region in the sub-scanning cross-section (the Y-Z cross-section). FIG. 2A illustrates the beam width of the laser beam 30, and FIG. 2B illustrates a principal ray of the laser beam 30. Note that both FIG. 2A and FIG. 2B are depicted in the right-handed coordinate system.

As illustrated in FIG. 2A, a laser chip that is the VCSEL 21 including a plurality of light emitting units is housed in a package member 20, and the side thereof from which the laser beam 30 is output is sealed with a cover member (hereinafter, referred to as "cover glass") 22. After passing through a conversion element (hereinafter, referred to as a "quarter-wave plate") 23, the laser beams output from the cover glass 22 are coupled so as to have predetermined divergence properties (classified as parallel light beams, weak divergent light beams, and weak convergent light beams) and to travel in a direction of a predetermined emission axis by a coupling element (hereinafter, referred to as a "coupling lens") 24 in accordance with the characteristics of optical systems thereafter.

The laser beam 30 output from the coupling lens 24 is split into scanning beam 30a and monitoring beam 30b by an optical path splitting element (hereinafter, referred to as an "aperture mirror") 16. Among the laser beams 30 incident on the aperture mirror 16, a part having the largest intensity passes through an aperture formed at the center of the aperture mirror 16. The laser beam 30 incident on the periphery of the aperture are reflected thereby as the monitoring light beam 30b. The scanning beam 30a is incident on the cylindrical lens.

By contrast, after the optical path is bended by a bending mirror 17 at an angle of 90 degrees, the monitoring beam 30b is incident on a monitoring element 19 (hereinafter, referred to as an intensity detector) by the action of a condensing lens 18. Based on the detection result of the intensity detector 19, the light-emitting output of the light emitting unit is adjusted. If the intensity of the monitoring beam 30b is smaller than a predetermined value, accuracy in the detection of the intensity detector 19 is decreased to cause the light-emitting output of the light-emitting unit unstable to result in deterioration in the quality of an output image such as an occurrence of an uneven density.

As illustrated in FIG. 2B, the cover glass 22 and the quarter-wave plate 23 are tilted by being rotated along an axis that is perpendicular to the sub-scanning cross-section. The cover glass 22 is tilted by being rotated at an angle of $\beta 1=+16$ degrees ("+" indicates a rotation in a clockwise direction, i.e., a rotation in a positive direction about an X axis), and the quarter-wave plate 23 is tilted at an angle of $\beta 2=-8$ degrees ("−" indicates a rotation in the counterclockwise direction, i.e., a rotation in a negative direction about the X axis), thereby causing the optical axis of the output beams to shift to the directions perpendicular to the traveling direction thereof.

Locating the cover glass 22 and the quarter-wave plate 23 in this manner makes it possible to avoid an occurrence of instability in the light-emitting output caused by the laser beam 30 reflected by the incident surface or by the exit surface, or by both, of both of the optical elements to go back to the VCSEL (active layer) 21. Furthermore, by rotating the optical elements in the directions that are opposite to each other, it is possible to reduce the shift amount of the exit optical axis from the quarter-wave plate 23 with respect to the incident optical axis on the cover glass 22. Because the cover glass 22 and the quarter-wave plate 23 are located between the VCSEL 21 and the coupling lens 24, that is, in the optical path of the strongly divergent light beams, wavefront aberration is likely to be generated. However, with the arrangement described above, the wavefront aberration generated in each of the optical elements can be cancelled out. The details thereof will be described later.

Figure 3A:
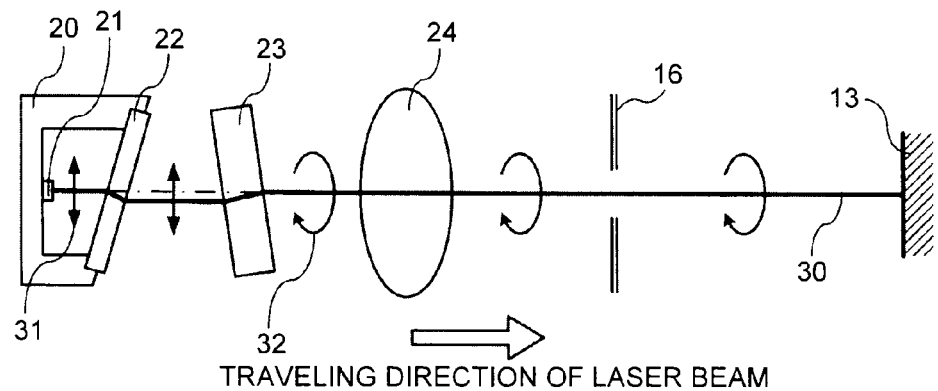
FIGS. 3A and 3B are schematics for explaining linearly polarized light and circularly polarized light in an incident beam and a reflected beam that has been reflected by a deflector.
Figure 3B:
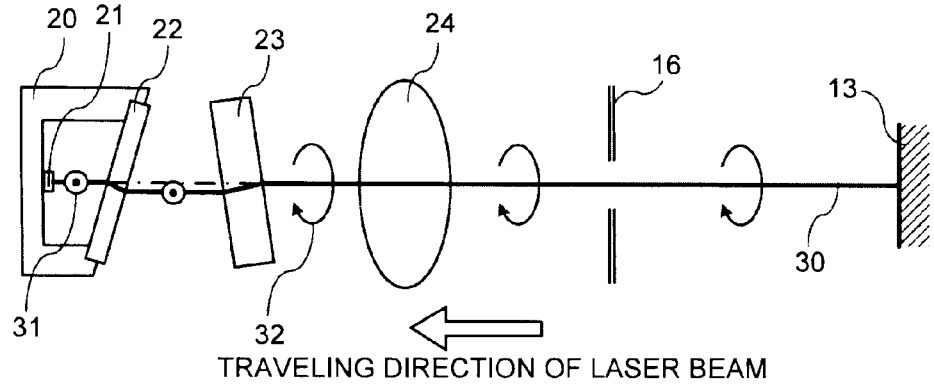

FIGS. 3A and 3B illustrate linearly polarized light and circularly polarized light in the incident beam and the reflected light on the deflector.

As illustrated in FIGS. 2A and 2B, and FIG. 3A, the laser beam 30 emitted by the VCSEL 21 is linearly polarized light 31 having a plane of polarization parallel to the sub-scanning cross-section. Therefore, the laser beam 30 is incident on the incident surface and the exit surface of the cover glass 22, and the incident surface of the quarter-wave plate 23 in p-polarized light. The laser beams are converted into circularly polarized light 32 on the exit surface of the quarter-wave plate.

Figure 4:
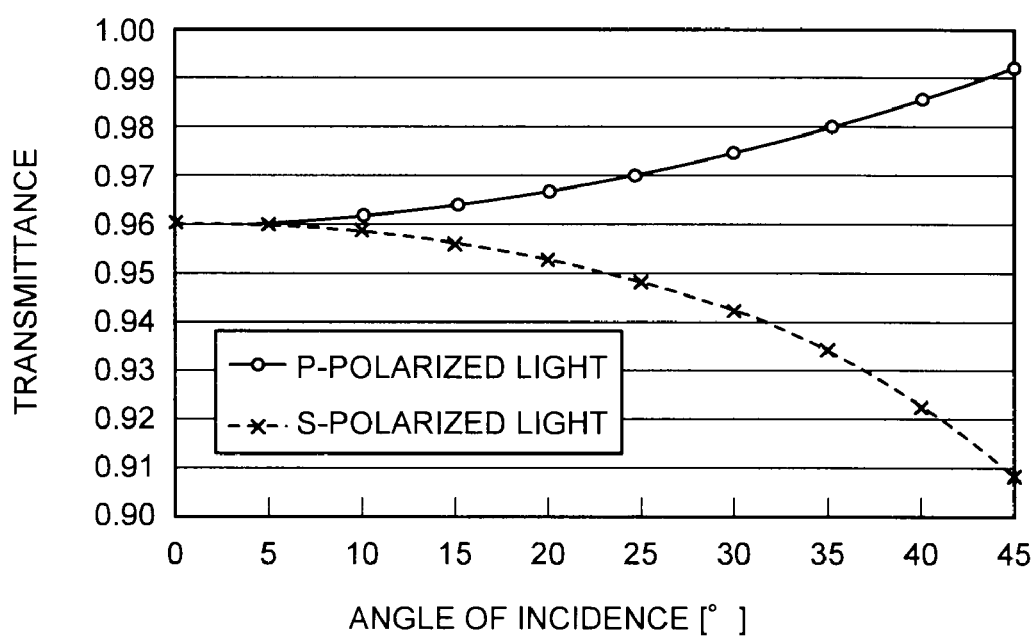
FIG. 4 is a graph illustrating the relationship between an angle of incidence and transmittance.

FIG. 4 illustrates an example of the incident angle dependence of the transmittance of p-polarized light and s-polarized light.

As illustrated in FIG. 4, the transmittance of the p-polarized light is larger than that of the s-polarized light. Accordingly, by employing the configuration in which the cover glass 22 and the quarter-wave plate 23 are tilted in the plane parallel to the plane of polarization (p-polarized light) as illustrated in FIGS. 2A and 2B, and FIGS. 3A and 3B, compared with the configuration in which the cover glass 22 and the quarter-wave plate 23 are tilted in the plane perpendicular to the plane of polarization (s-polarized light), it is possible to decrease the reduction in the intensity that may occur on the incident surface and the exit surface of the cover glass 22, and the incident surface of the quarter-wave plate 23.

As described above, if the intensity of the monitoring beam 30b incident on the intensity detector 19 is smaller than a predetermined value, the accuracy in the detection of the intensity detector 19 is deteriorated, thereby making the light-emitting output of the light-emitting unit unstable. Therefore, it is preferable that the intensity of the monitoring beam 30b, that is, the intensity of the laser beams incident on the aperture mirror be large.

As illustrated in FIGS. 3A and 3B, because the laser beam 30 is converted into the circularly polarized light 32 in the exit surface of the quarter-wave plate 23, the transmittance thereof is reduced compared with the p-polarized light. Therefore, it is preferable that a non-reflective coating be applied at least on the exit surface of the quarter-wave plate 23 to decrease the reduction of the intensity.

The methods for applying the non-reflective coating on the exit surface of the quarter-wave plate 23 are not particularly restricted, and include a method in which a non-reflective coating film is formed on the surface thereof, for example.

Figure 5:
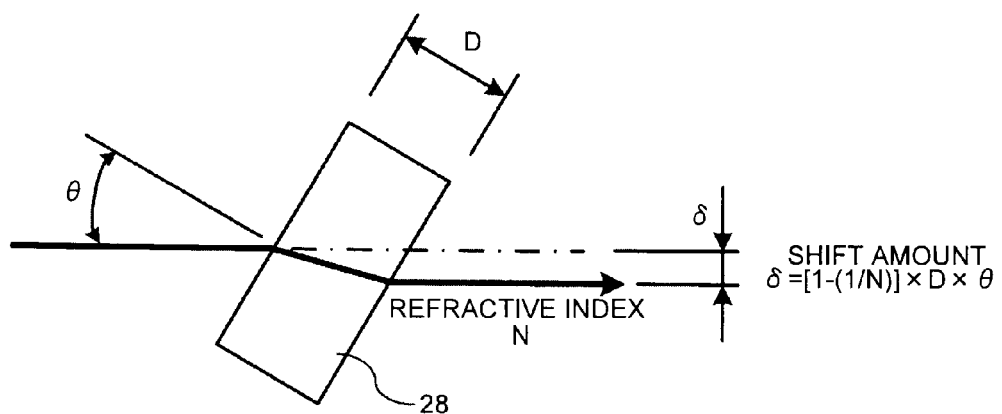
FIG. 5 is a schematic for explaining an angular shift of an optical axis (refraction of a laser beam) passing through a parallel plate glass.

FIG. 5 illustrates refraction of laser beams (rays) passing through a parallel plate glass 28, such as the cover glass 22 and the quarter-wave plate 23.

Generally, when the parallel plate glass 28 is tilted in a plane by an angle $\theta$, the shift amount $\delta$ of the outgoing beams with respect to the incident beams is expressed by Equation (1):

$$\delta = \{1-(1/N)\} \times D \times \theta \tag{1}$$

It is to be noted that N denotes a refractive index, and D denotes a thickness of the parallel plate glass.

In the configuration illustrated in FIG. 2B, the condition for effectively reducing the shift amount of the optical axis (principal ray) of the laser beams in a direction perpendicular to the traveling direction thereof is described below.

The thickness d1, the refractive index n1, and the angle of inclination $\beta 1$ of the cover glass 22, and the thickness d2, the refractive index n2, and the angle of inclination $\beta 2$ of the quarter-wave plate 23 are set so as to satisfy the relationship expressed by Equation (2):

$$|\delta 2| \leq 2 \times |\delta 1| \tag{2}$$

It is to be noted that $\delta 1$ denotes the shift amount of the cover glass 22, and $\delta 2$ denotes the shift amount of the quarter-wave plate 23.

In this way, the shift amount of the laser beam 30 output from the quarter-wave plate 23 with respect to the VCSEL 21 can be made equal to or less than the shift amount of the laser beam 30 output from the cover glass 22.

That is, Equation (3) should be satisfied:

$$|\{1-(1/n2)\} \times d2 \times \beta 2| \leq 2 \times |\{1-(1/n1)\} \times d1 \times \beta 1| \tag{3}$$

It is most preferable that $|\delta 2|=|\delta 1|$ be satisfied.

Table 1 is a table indicating the relationship between the set values of the cover glass and the quarter-wave plate.

TABLE 1

|   | Cover glass | Quarter-wave plate | Unit |
|---|---|---|---|
| n | 1.51 | 1.60 | [—] |
| d | 0.3 | 0.7 | [mm] |
| β | 10.0 | −3.9 | [degree] |
| δ | 0.0177 | −0.0177 | [mm] |

For example, assuming that the cover glass (d1=0.3 [mm], and n1=1.51) is arranged by $\beta 1=+10$ degrees, the quarter-wave plate (d2=0.7 [mm], and n2=1.60) is preferably arranged by |β2|<7.7 degrees, and most preferably by β2=−3.9 degrees.

The arrangement for reducing the shift amount in a light source unit including the VCSEL 21 having a plurality of light emitting units will be described with reference to FIG. 6.

Figure 6:
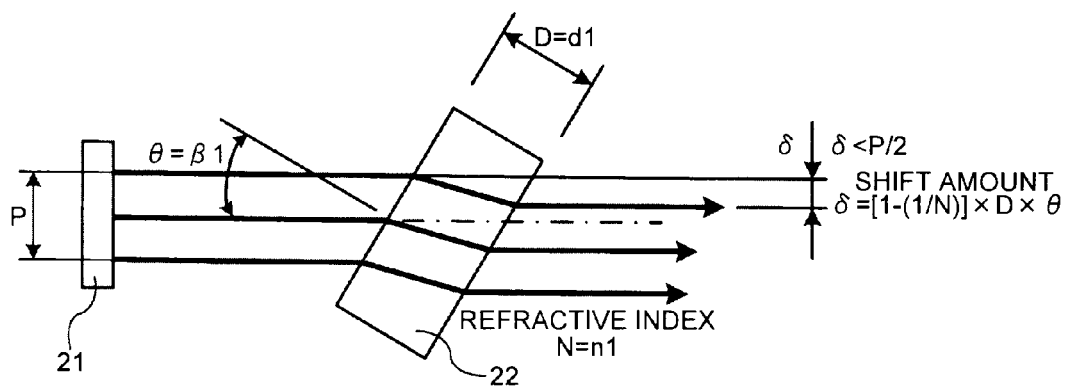
FIG. 6 is a schematic for explaining refraction of laser beams with the angular shift of optical axes that pass through a parallel plate glass, for which the optical axes are associated with light beams emitted by a VCSEL including a plurality of light emitting points.

As illustrated in FIG. 6, if the interval between the light emitting units that are most distant from each other in the plane of polarization is denoted by P, by setting d1, n1, and β1 such that δ<P/2 is satisfied, it is possible to avoid the shift amount in the cover glass 22 to become unnecessarily large.

For example, in a combination of the cover glass 22 (n1=1.51, and d1=2 [mm]) and the VCSEL 21 (the interval P between the light emitting units=0.2 [mm]), when the angle of inclination of the cover glass is set so as to satisfy β1=8.5 degrees, δ=0.1 [mm] (=P/2) is satisfied.

Accordingly, in this case, it is preferable that |β1|<8.5 degrees be satisfied.

Furthermore, in the optical scanning device according to the present invention, a filtering member (hereinafter, referred to as an "ND filter") that reduces the intensity of the laser beams may be arranged in the optical path between the optical splitter and the deflector.

Figure 7A:
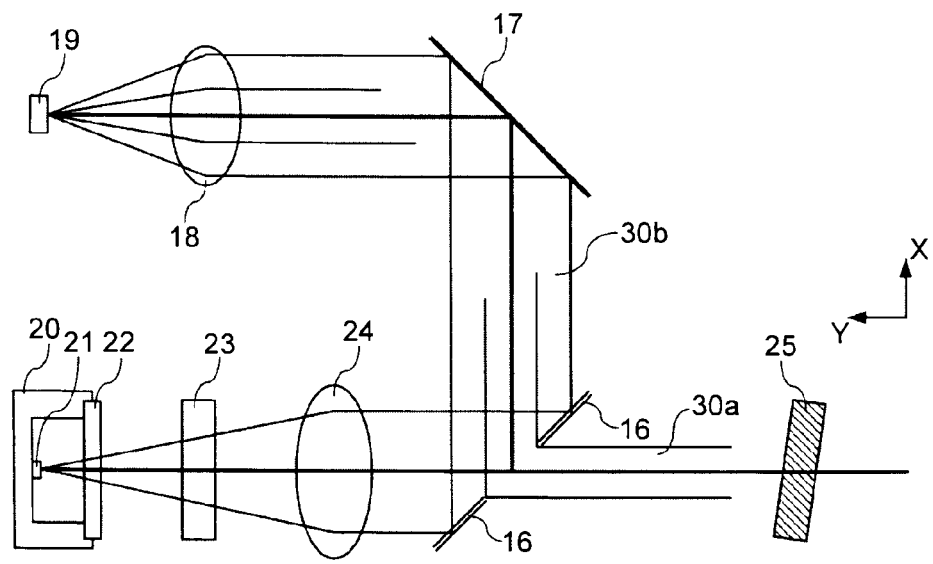
FIG. 7A is a schematic of an example of an aspect in which a neutral density (ND) filter is arranged in the main-scanning cross-section (X-Y cross-section) depicted in the right-handed coordinate system.
Figure 7B:
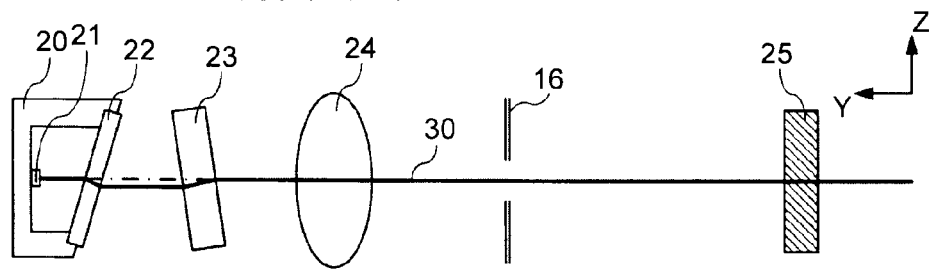
FIG. 7B is a schematic of the example of the aspect in the sub-scanning cross-section (Y-Z cross-section) depicted in the right-handed coordinate system.

FIGS. 7A and 7B illustrate examples in which an ND filter 25 is arranged. Note that both FIG. 7A and FIG. 7B are depicted in the right-handed coordinate system.

As illustrated in FIG. 7A, the central part of the laser beam 30 passing through the aperture of the aperture mirror 16 and having a large intensity becomes the scanning beam 30a. The part that is reflected on the periphery of the aperture becomes the monitoring light beam 30b. Therefore, the scanning beam 30a can have a sufficient intensity for the sensitivity of the photosensitive element 52 usually. As for the monitoring beam 30b, on the contrary, if the light-emitting output from the VCSEL 21 is made large to keep the accuracy in the detection, the intensity of the scanning beam 30a may become too large for the sensitivity of the photosensitive element 52.

Therefore, in such a case, by arranging the ND filter 25 that reduces the intensity of the laser beam 30 by a predetermined amount in the optical path between the aperture mirror 16 and the deflector 12, it is possible to set the intensity of the scanning beam 30a and the intensity of the monitoring beam 30b to respectively appropriate values.

At this time, the ND filter 25 is preferably tilted in the X-Y plane, differently from the cover glass 22 and the quarter-wave plate 23. In this manner, the laser beam 30 reflected on the ND filter can be prevented from returning to the VCSEL 21.

Figure 8A:
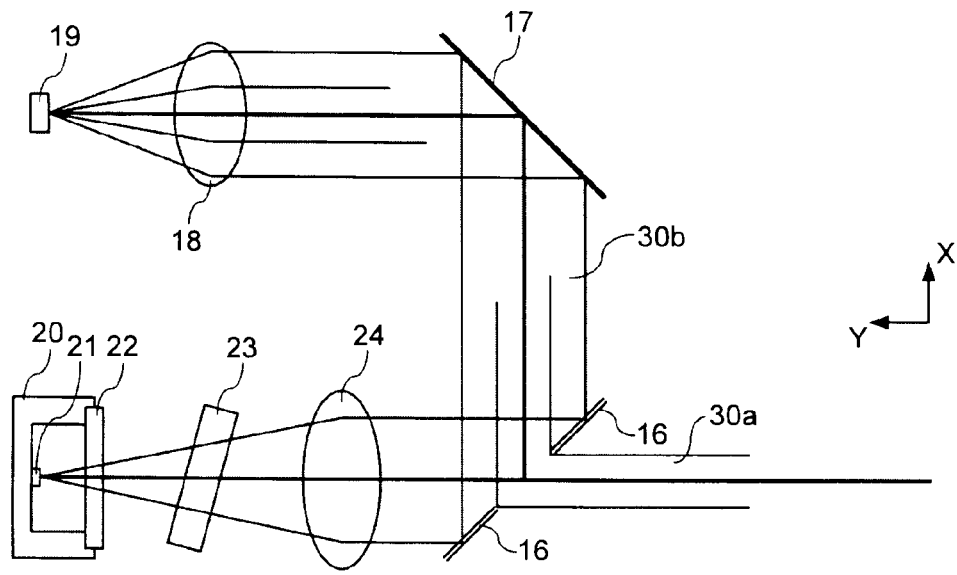
FIG. 8A is a schematic of an example of an aspect in which a quarter-wave plate is tilted by being rotated along an axis that is perpendicular to a plane of polarization of linearly polarized light and a plane perpendicular thereto in the main-scanning cross-section (X-Y cross-section) depicted in the right-handed coordinate system.
Figure 8B:
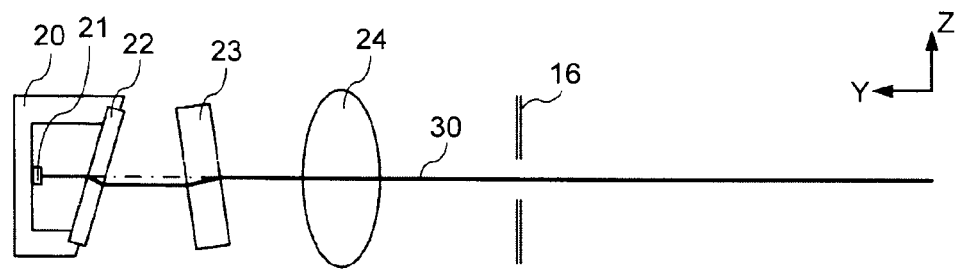
FIG. 8B is a schematic of the example of the aspect in the sub-scanning cross-section (Y-Z cross-section) depicted in the right-handed coordinate system.

In the aspect illustrated in FIGS. 2A and 2B, the cover glass 22 and the quarter-wave plate 23 are tilted in a plane parallel to the plane of polarization only. Alternatively, as illustrated in FIGS. 8A and 8B that are depicted in the right-handed coordinate system, the quarter-wave plate 23 that is located at the second closest position, with the cover glass 22 the closest, to the VCSEL 21, may be further tilted by a predetermined angle in a plane perpendicular to the plane of polarization.

As described above, by rotating the quarter-wave plate 23 in two directions, it is possible to avoid the laser beams 30 reflected on the quarter-wave plate 23 to return to the VCSEL 21. Because the quarter-wave plate 23 is more distant from the VCSEL 21 than the cover glass 22 (the optical path therebetween is longer), the predetermined angle of inclination by which the quarter-wave plate 23 is tilted can be made smaller than the case where the cover glass 22 is tilted.

In the aspect illustrated in FIGS. 2A and 2B, the aperture mirror 16 is used to split the optical path of the scanning beam 30a from the optical path of the monitoring beam 30b. Alternatively, as illustrated in FIG. 9 that is depicted in the right-handed coordinate system, an optical path splitting prism 27 using a parallel plate glass 28 may be located in the optical path between the cover glass 22 and the quarter-wave plate 23 to realize the optical path splitting.

Figure 9:
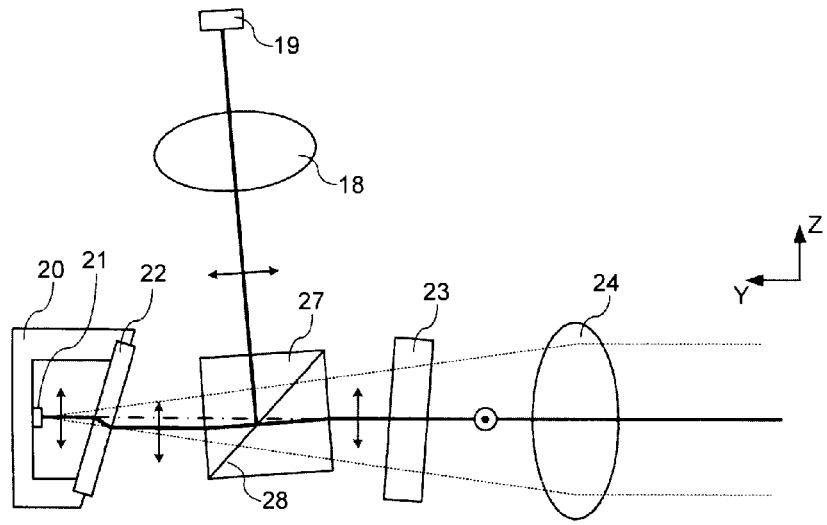
FIG. 9 is a schematic of an example of an aspect in which an optical path splitting prism is arranged as an optical splitter depicted in the right-handed coordinate system.

In FIG. 9, the cover glass 22 and the quarter-wave plate 23 are tilted in the same direction in the plane parallel to the plane of polarization, and the optical path splitting prism 27 is tilted in the direction opposite to that for the cover glass 22 and the quarter-wave plate 23.

Figure 10:
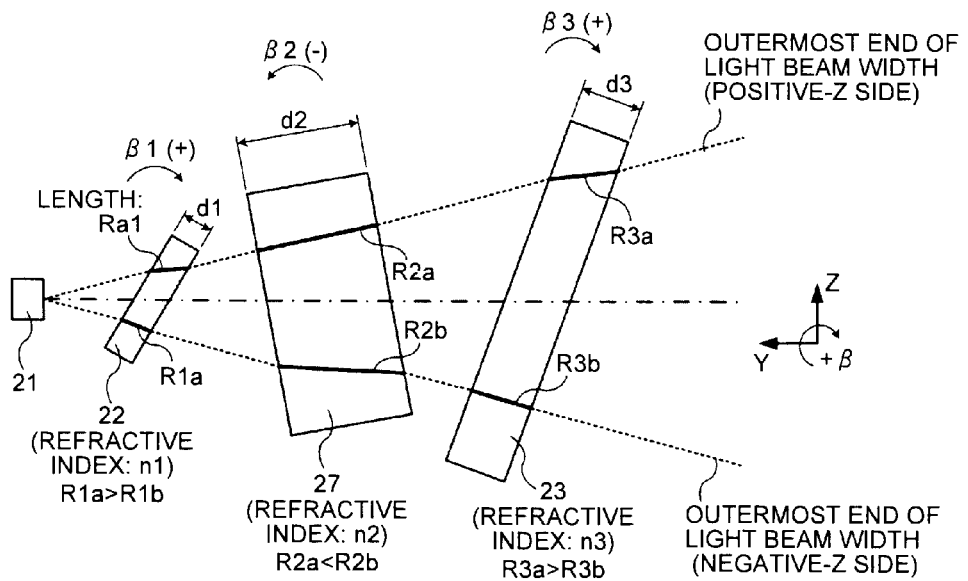
FIG. 10 is a schematic for explaining wavefront aberration generated by a parallel plate optical element depicted in the right-handed coordinate system.

An explanation is given to a generation of wavefront aberration in each of the optical elements when the parallel plate optical elements are arranged by being tilted in the optical path between the VCSEL 21 and the coupling lens 24 (that is, the strongly divergent beams) with reference to the schematic of FIG. 10 that is depicted in the right-handed coordinate system.

The inclination (β) of each of the optical elements is represented by (+) in the clockwise direction, and (−) in the counterclockwise direction. The thicknesses of the cover glass 22, the optical path splitting prism 27, and the quarter-wave plate 23 are denoted by d1, d2, and d3, respectively (note that d1<d3<d2). The refractive indexes thereof are denoted by n1, n2, and n3, respectively.

As illustrated in FIG. 10, for example, when the cover glass 22 is arranged by being tilted by the angle β1 in the clockwise direction (+), the optical path length $n1 \cdot R1a$ along an outermost path on the positive-Z side (in the cover glass 22) of the beam width in the divergent beams emitted from the VCSEL 21 is longer than the optical path length $n1 \cdot R1b$ along the outermost path on the negative-Z side. Thus, the optical path lengths are different from each other in a single optical element to result in the generation of the wavefront aberration.

To address this, in accordance with the thickness of each of the optical elements, the cover glass is arranged to be tilted in the positive direction for the inclination β, the optical path splitting prism is tilted in the negative direction, and the quarter-wave plate is tilted in the positive direction such that the relationship between the optical path lengths is set to satisfy Equation (4) and, accordingly, the wavefront aberration generated in each of the optical elements can be cancelled out with each other.

$$n1 \cdot R1a + n2 \cdot R2a + n3 \cdot R3a = n1 \cdot R1b + n2 \cdot R2b + n3 \cdot R3b \quad (4)$$

In other words, when the optical elements are arranged by being tilted in the Y-Z plane, that is, by being rotated along an axis that is perpendicular to the Y-Z plane, so as to prevent the reflected light on the optical elements from returning to the VCSEL 21, it is preferable to set the angle of inclination β in such a way that the sum of the optical path lengths in the optical elements on the positive-Z side coincides with that on the negative-Z side by taking account of the fact that an optical path length depends on the thickness of an optical element.

For example, by setting the thickness d, the refractive index n, and the angle of inclination β to the values below, Equation (4) can be satisfied.

the cover glass 22: d1=1.0 [mm], n1=1.51, and β1=+30 degrees optical path splitting prism 27: d2=5.0 [mm], n2=1.51, and β2=−10 degrees quarter-wave plate 23: d3=4.4 [mm], n3=1.60, and β3=+5 degree With these set values, $n1 \cdot R1a = 1.654$, $n2 \cdot R2a = 7.552$, $n3 \cdot R3a = 7.111$, $n1 \cdot R1b = 1.599$, $n2 \cdot R2b = 7.713$, $n3 \cdot R3b = 7.044$, therefore, $n1 \cdot R1a + n2 \cdot R2a + n3 \cdot R3a = n1 \cdot R1b + n2 \cdot R2b + n3 \cdot R3b = 16.316$.

The image forming apparatus according to the present invention includes the optical scanning device according to the present invention.

Figure 11:
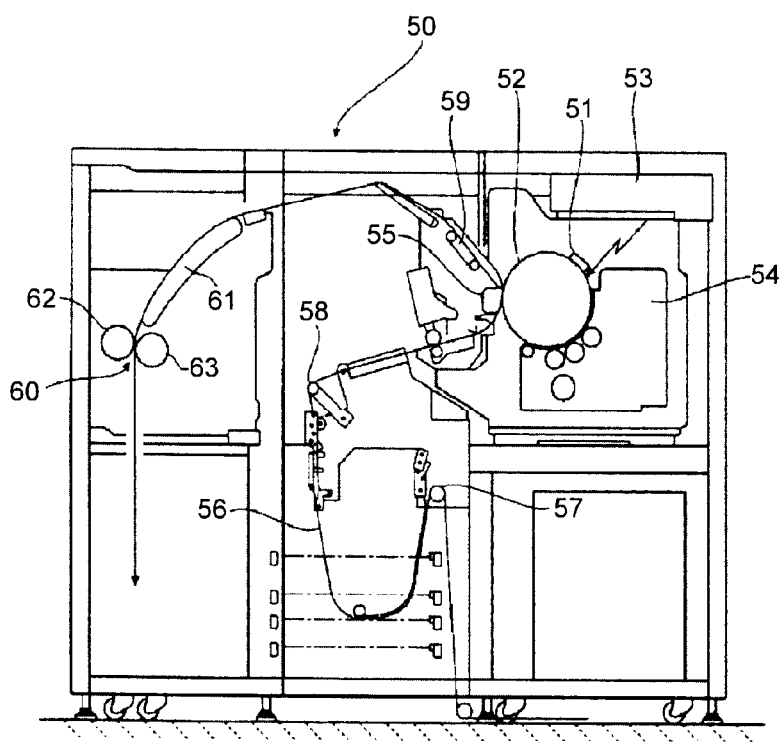
FIG. 11 is a cross sectional schematic of an example of an image forming apparatus according to the present invention.
Figure 12:
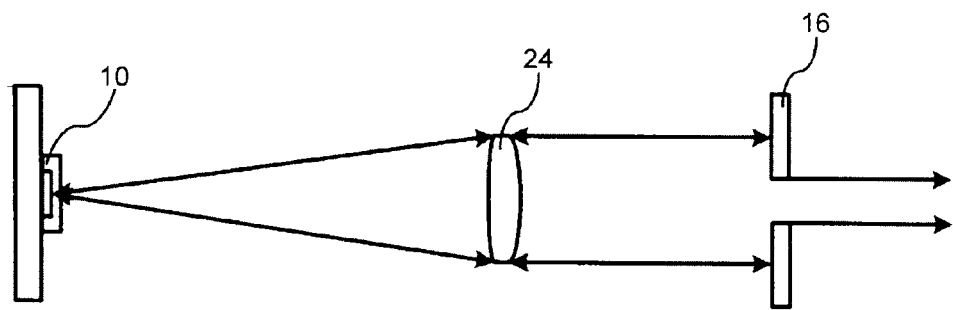
FIG. 12 is a view of a schematic structure of a pre-deflector optical system in a conventional optical scanning device.
Figure 13:
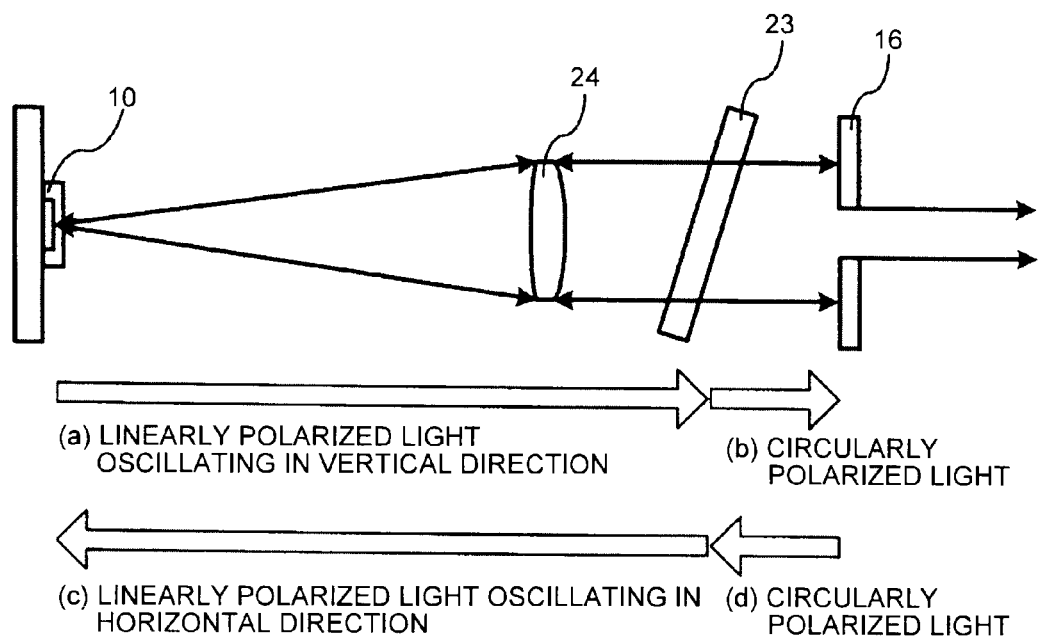
FIG. 13 is a view of an example of a schematic structure of a pre-deflector optical system equipped with a quarter-wave plate.

FIG. 11 is a view of a schematic structure illustrating an example of the image forming apparatus according to the present invention.

As illustrated in FIG. 11, an image forming apparatus 50 according to the present invention includes the photosensitive element 52, a charging unit 51 that charges the surface of the photosensitive element 52, an optical scanning unit 53, which includes the optical scanning device according to the present invention, irradiating light on the charged surface of the photosensitive element 52 to form an electrostatic latent image, a developing unit that deposits toner on the electrostatic latent image to form a toner image, a transfer unit that transfers the toner image on the photosensitive element to an image recording sheet 56 that is a recording medium, and a fixing unit 60 that fixes the toner image formed on the recording medium. The optical scanning unit 53 uses the VCSEL as a light source unit.

The image forming process in the image forming apparatus 50 is described.

Laser light is irradiated from the optical scanning device included in the optical scanning unit 53 according to the present invention on the surface of the photosensitive element 52 charged by the charging unit 51 to form an electrostatic latent image. In irradiation, the laser light is irradiated on the surface of the photosensitive element 52 at a predetermined incident angle with respect to the normal line on the surface of the photosensitive element 52. The photosensitive element 52 with the electrostatic latent image formed thereon is rotated in the clockwise direction, and a developing unit 54 develops the electrostatic latent image with toner to form a toner image.

On the other hand, the image recording sheet 56 is conveyed from a paper feed tray or the like by using conveying devices from 57 to 59, and pressed against the photosensitive element 52 on a transfer unit 55. By this means, the toner image formed on the photosensitive element 52 is transferred onto the image recording sheet 56, and conveyed to the fixing unit 60.

The fixing unit 60 includes a preheater 61, a heat roller 62, and a backup roller 63. These rollers apply heat and pressure to the image recording sheet 56 to fix the toner image formed thereon. By this means, the image is formed on the image recording sheet 56.

That is, the charging unit 51 corresponds to the charging unit that charges the surface of the photosensitive element 52, the photosensitive element 52 corresponds to the photosensitive element, and the optical scanning device included in the optical scanning unit 53 according to the present invention corresponds to the optical scanning unit that irradiates light on the surface of the photosensitive element 52 charged by the charging unit 51 to form an electrostatic latent image.

The developing unit 54 corresponds to the developing unit that deposits toner on the electrostatic latent image formed on the photosensitive element 52 to form a toner image, the transfer unit 55 corresponds to the transfer unit that transfers the toner image formed on the photosensitive element 52 to the image recording sheet 56, and the fixing unit 60 corresponds to the fixing unit that fixes the toner image formed on the image recording sheet 56.

Then, the photosensitive element 52 from which the toner image is transferred onto the image recording sheet 56 continues to rotate, the subsequent image processing (charging, exposure, development, transfer, and fixing) is repeated, and the image recording sheet 56 is supplied from the paper feed tray or the like sequentially to carry on image forming processes.

As described above, with the optical scanning device according to the present invention, aberration generated in a multi-beam scanning device can be reduced, and the light use efficiency can be improved. An image forming apparatus including the optical scanning device can output an image on which an occurrence of an uneven density is suppressed.

According to the present invention, the amount of aberration can be reduced, an optical scanning device that scans a target surface to be scanned with a light beam and writes image information onto the target surface to be scanned includes a light source unit that includes a light emitting unit composed of a laser light source emitting linearly polarized light inside a package member, a deflector that deflects a light beam emitted from the light emitting unit, a pre-deflector optical system arranged on an optical path between the light emitting unit and the deflector, and a scanning optical system that scans the target surface to be scanned with the light beam deflected by the deflector, wherein the pre-deflector optical system includes at least two parallel plate optical elements each composed of a transparent medium having an incident surface and an exit surface parallel to each other, the parallel plate optical elements being arranged to be tilted in inclination that is opposite to each other in a plane of polarization of the linearly polarized light, and, accordingly, the reduction in the intensity can be suppressed.

According to the present invention, the package member of the light source unit includes a cover member on an exit side of the light emitting unit, the pre-deflector optical system further includes a conversion element that converts the linearly polarized light emitted from the light emitting unit into circularly polarized light, and a coupling element that couples a laser beam converted into the circularly polarized light by the conversion element, and the cover member and the conversion element are the parallel plate optical elements, and arranged to be tilted in inclination that is opposite to each other in the plane of polarization of the linearly polarized light, so that the shift amount of the optical axis of the laser beams in a direction perpendicular to the traveling direction thereof can be reduced, and the generation of the aberration can be reduced effectively.

According to the present invention, since the linearly polarized light emitted from the light emitting unit is p-polarized light to an incident surface of the cover member, the reduction in the intensity can be suppressed, and the intensity of the monitoring beams, which will be described later, can be secured in particular.

According to the present invention, since a optical splitter, that is arranged on the optical path between the conversion element and the deflector, includes an aperture through which a part of the light beam traveling through the coupling element and having the largest light intensity passes in center thereof and reflects the laser beam incident on a periphery of the aperture as a monitoring beam, and also a monitoring element that receives the monitoring beam reflected on the optical splitter to detect an intensity, the light-emitting output of the light emitting unit can be stabilized, and the accuracy in the detection of the intensity can be maintained.

According to the present invention, since a non-reflective coating is applied on at least an exit surface of the conversion element included in the optical scanning device, the reduction in the intensity can be suppressed, and the number of surfaces to which a non-reflective coating is applied can be made minimum.

According to the present invention, a shift amount δ1 of an outgoing beam with respect to the laser beam incident on the cover member in the plane of polarization and a shift amount δ2 of an outgoing beam with respect to the laser beam incident on the conversion element in the plane of polarization satisfy a relationship of $|\delta 2|<2\times|\delta 1|$, and hence, the shift amount of the laser beam that is measured with respect to the light emitting unit after being emitted from the conversion element can be reduced effectively.

According to the present invention, the optical scanning device includes a plurality of the light emitting unit that is provided in plurality, and, if an interval between two of the light emitting units arranged in positions most distant from each other in the plane of polarization among the light emitting units of the light source unit is denoted by P, since a shift amount δ of an outgoing beam with respect to the laser beam incident on the cover member in the plane of polarization satisfies an inequality δ<P/2, the upper limit of the shift amount of the laser beam shifted by the cover member can be specified, and the shift amount of the laser beam emitted from the cover member with respect to the light emitting units can be reduced effectively.

According to the present invention, since a filter member that reduces an intensity of the laser beam is arranged on the optical path between the optical splitter and the deflector, the intensities of the scanning beams and the monitoring beams can be optimized.

According to the present invention, among the parallel plate optical elements arranged to be tilted in the plane of polarization of the linearly polarized light, the parallel plate optical elements other than the one that is arranged closest to the light emitting element are arranged to be tilted in a plane perpendicular to the plane of polarization of the linearly polarized light as well, so that the laser beams can be prevented from returning to the light emitting unit.

According to the present invention, in the parallel plate optical elements arranged on the optical path between the light emitting unit and the coupling element to be tilted in the plane of polarization of the linearly polarized light, the sum of optical path lengths at one end specifying light beam widths in the parallel plate optical elements is equal to the sum of the optical path lengths at the other end, and, accordingly, the wavefront aberration generated in each of the optical elements can be cancelled out with each other.

According to the present invention, the aberration generated in a multi-beam scanning device can be reduced, and the light use efficiency can be improved, so that it becomes possible to output an image in which an occurrence of an uneven density is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a target surface to be scanned with a light beam and writes image information onto the target surface to be scanned, the optical scanning device comprising:
    a light source unit that includes a light emitting unit composed of a laser light source emitting linearly polarized light inside a package member;
    a deflector that deflects a light beam emitted from the light emitting unit;
    a pre-deflector optical system arranged on an optical path between the light emitting unit and the deflector; and
    a scanning optical system that scans the target surface to be scanned with the light beam deflected by the deflector, wherein
    the pre-deflector optical system includes at least two parallel plate optical elements each composed of a transparent medium having an incident surface and an exit surface parallel to each other, the parallel plate optical elements being arranged to be tilted in inclination that is opposite to each other in a plane of polarization of the linearly polarized light.

2. The optical scanning device according to claim 1, wherein
    the package member of the light source unit includes a cover member on an exit side of the light emitting unit,
    the pre-deflector optical system further includes a conversion element that converts the linearly polarized light emitted from the light emitting unit into circularly polarized light, and a coupling element that couples a laser beam converted into the circularly polarized light by the conversion element, and
    the cover member and the conversion element are the parallel plate optical elements, and arranged to be tilted in inclination that is opposite to each other in the plane of polarization of the linearly polarized light.

3. The optical scanning device according to claim 2, wherein the linearly polarized light emitted from the light emitting unit is p-polarized light to an incident surface of the cover member.

4. The optical scanning device according to claim 2, further comprising:
    an optical splitter that is arranged on the optical path between the conversion element and the deflector, includes an aperture through which a part of the light beam traveling through the coupling element and having the largest light intensity passes in center thereof, and reflects the laser beam incident on a periphery of the aperture as a monitoring beam; and
    a monitoring element that receives the monitoring beam reflected on the optical splitter to detect an intensity.

5. The optical scanning device according to claim 2, wherein a non-reflective coating is applied on at least an exit surface of the conversion element.

6. The optical scanning device according to claim 2, wherein a shift amount 61 of an outgoing beam with respect to the laser beam incident on the cover member in the plane of polarization and a shift amount 62 of an outgoing beam with respect to the laser beam incident on the conversion element in the plane of polarization satisfy a relationship of $|\delta 2|<2\times|\delta 1|$.

7. The optical scanning device according to claim 2, wherein
the light emitting unit is provided in plurality, and
a shift amount δ of an outgoing beam with respect to the laser beam incident on one of the parallel plate optical elements in the plane of polarization satisfies a relationship of δ<P/2 where P is an interval between two of the light emitting units arranged in positions most distant from each other in the plane of polarization among the light emitting units of the light source unit.

8. The optical scanning device according to claim 4, wherein a filter member that reduces an intensity of the laser beam is arranged on the optical path between the optical splitter and the deflector.

9. The optical scanning device according to claim 5, further comprising:
an optical splitter that is arranged on the optical path between the conversion element and the defector, includes an aperture through which a part of the light beam traveling through the coupling element and having the largest light intensity passes in center thereof, and reflects the laser beam incident on a periphery of the aperture as a monitoring beam; and
a monitoring element that receives the monitoring beam reflected on the optical splitter to detect an intensity,
wherein a filter member that reduces an intensity of the laser beam is arranged on the optical path between the optical splitter and the deflector.

10. The optical scanning device according to claim 6, further comprising:
an optical splitter that is arranged on the optical path between the conversion element and the deflector, includes an aperture through which a part of the light beam traveling through the coupling element and having the largest light intensity passes in center thereof, and reflects the laser beam incident on a periphery of the aperture as a monitoring beam; and
a monitoring element that receives the monitoring beam reflected on the optical splitter to detect an intensity,
wherein a filter member that reduces an intensity of the laser beam is arranged on the optical path between the optical splitter and the deflector.

11. The optical scanning device according to claim 7, further comprising:
an optical splitter that is arranged on the optical path between the conversion element and the deflector, includes an aperture through which a part of the light beam traveling through the coupling element and having the largest light intensity passes in center thereof and reflects the laser beam incident on a periphery of the aperture as a monitoring beam; and
a monitoring element that receives the monitoring beam reflected on the optical splitter to detect an intensity,
wherein a filter member that reduces an intensity of the laser beam is arranged on the optical path between the optical splitter and the deflector.

12. The optical scanning device according to claim 1, wherein among the parallel plate optical elements arranged to be tilted in the plane of polarization of the linearly polarized light, the parallel plate optical elements other than the one that is arranged closest to the light emitting element are arranged to be tilted in a plane perpendicular to the plane of polarization of the linearly polarized light as well.

13. The optical scanning device according to claim 1, wherein, in the parallel plate optical elements arranged on the optical path between the light emitting unit and the coupling element to be tilted in the plane of polarization of the linearly polarized light, the sum of optical path lengths at one end specifying light beam widths in the parallel plate optical elements is equal to the sum of the optical path lengths at the other end.

14. An image forming apparatus comprising the optical scanning device according to claim 1.

* * * * *